United States Patent
Moon et al.

(10) Patent No.: US 10,164,543 B2
(45) Date of Patent: Dec. 25, 2018

(54) SYSTEM AND METHOD FOR CONTROLLING POWER CONVERTER WITH ADAPTIVE TURN-ON DELAY

(71) Applicant: SEMICONDUCTOR COMPONENTS INDUSTRIES, LLC, Phoenix, AZ (US)

(72) Inventors: Sangcheol Moon, Bucheon (KR); Jintae Kim, Sungnam-si (KR); Hangseok Choi, Suwon (KR)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days.

(21) Appl. No.: 15/486,926

(22) Filed: Apr. 13, 2017

(65) Prior Publication Data

US 2018/0302000 A1    Oct. 18, 2018

(51) Int. Cl.
*H02M 3/335* (2006.01)

(52) U.S. Cl.
CPC .............. *H02M 3/33592* (2013.01)

(58) Field of Classification Search
CPC ......... H02M 3/33553; H02M 3/33592; H02M 3/1588
See application file for complete search history.

(56) References Cited

U.S. PATENT DOCUMENTS

| | | | | |
|---|---|---|---|---|
| 6,396,250 B1* | 5/2002 | Bridge | ................ | H02M 3/1588 323/283 |
| 2002/0141209 A1* | 10/2002 | Bridge | .............. | H02M 3/33592 363/89 |
| 2006/0120123 A1* | 6/2006 | Phadke | ............... | H02M 3/1588 363/125 |
| 2008/0049473 A1* | 2/2008 | Sugahara | .............. | H02M 3/156 363/89 |

OTHER PUBLICATIONS

Hangseok Choi et al., "Self-Tuning Adaptive Dead Time Control for Continuous Conduction Mode and Discontinuous conduction Mode Operation of a Flyback Converter", U.S. Appl. No. 15/358,703, filed Nov. 22, 2016, 33 pages.
Hangseok Choi et al., "Adaptive Turn-Off Trigger Blanking for Synchronous Rectification", U.S. Appl. No. 15/358,424, filed Nov. 22, 2016, 26 pages.
STMicroelectronics, SRK2001 Datasheet-production data, Adaptive Synchronous Rectification Controller for LLC Resonant Converter, Feb. 2017, 20 pages.

* cited by examiner

*Primary Examiner* — Harry Behm
(74) *Attorney, Agent, or Firm* — AMPACC Law Group, PLLC (57) ABSTRACT

A method for controlling a power converter includes generating a load detection signal in response to a conduction signal and a driver input signal, and generating a gate control signal in response to the load detection signal. The gate control signal is delayed by a delay amount in response to the load detection signal. An apparatus for controlling a (Continued)

power converter includes a gate signal control circuit generating a load detection signal in response to a conduction signal and a driver input signal, and a synchronous rectifier (SR) driver generating a gate control signal in response to the load detection signal.

18 Claims, 5 Drawing Sheets

SYSTEM AND METHOD FOR CONTROLLING POWER CONVERTER WITH ADAPTIVE TURN-ON DELAY

BACKGROUND

This present disclosure relates to integrated circuit devices, and more particularly to a power converter.

Such a power converter may be an inductor-inductor-capacitor (LLC) converter (that is, a converter using a resonating circuit comprising two inductors and a capacitor) based on a synchronous rectifier controller (SRC). For example, the LLC converter includes a pair of SRCs, which respectively drive a pair of switching devices. The switching devices rectify output currents of secondary windings to generate a secondary side current, which charges an output capacitor.

In a low load condition, a primary side switching transition of the LLC converter may cause a capacitive current spike in a secondary side circuit when the switching devices are turned off. The capacitive current spike may induce mis-triggering of the switching device, leading to an inversion current through the switching device. Such an inversion current may discharge the output capacitor to decrease the efficiency of a regulating operation of the LLC converter.

DETAILED DESCRIPTION

Figure 1:
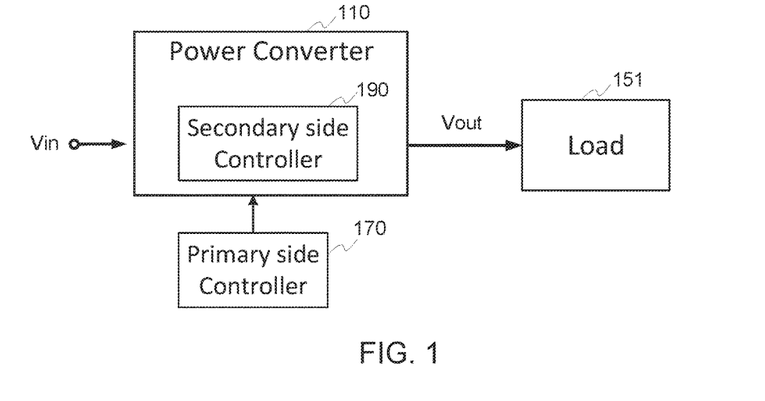
FIG. 1 is a block diagram illustrating a power converter according to an embodiment.

FIG. 1 is a block diagram illustrating a power converter 110 according to an embodiment. The power converter 110 receives an input voltage $V_{in}$ and provides an output voltage $V_{out}$ to a load 151. In an embodiment, the power converter 110 is controlled by a primary side controller 170 and a secondary side controller 190. The primary side controller 170 and the secondary side controller 190 may be integrated in one or more semiconductor chips. These semiconductor chips may be packaged by themselves or together with one or more other semiconductor chips. For example, the secondary side controller 190 may include one or more SR controllers.

The load 151 may include one or more integrated chips (ICs). In an embodiment, the output voltage $V_{out}$ is used to supply power to one or more of a Central Processing Unit (CPU), a Graphics Processing Unit (GPU), an integrated memory circuit, a battery charger, a light emitting diode (LED), or generally any type of electrical load.

Figure 2:
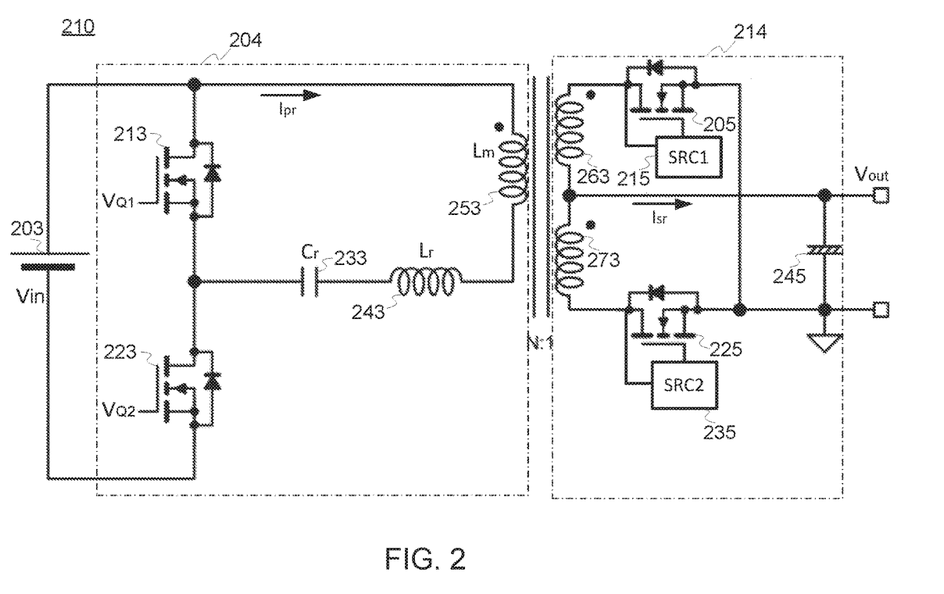
FIG. 2 is a circuit diagram illustrating an LLC converter suitable for use as the power converter of FIG. 1 according to an embodiment.

FIG. 2 is a circuit diagram illustrating an LLC converter 210 suitable for use as the power converter 110 of FIG. 1 according to an embodiment. The LLC converter 210 includes a primary side circuit 204, which includes first and second primary switching devices 213 and 223, a resonant capacitor 233, a resonant inductor 243, and a magnetizing inductor 253. For example, the first and second primary switching devices 213 and 223 are metal-oxide-semiconductor field-effect transistors (MOSFETs).

The LLC converter 210 further includes a secondary side circuit 214. The secondary side circuit 214 includes a first secondary winding 263, a first switching device 205, a first SR controller 215, a second secondary winding 273, a second switching device 225, a second SR controller 235, and an output capacitor 245. In an embodiment, the first and second switching devices 205 and 225 are MOSFETs. Drains of the first and second switching device 205 and 225 in FIG. 2 are respectively coupled to the first and second secondary windings 263 and 273. Sources of the first and second switching device 205 and 225 in FIG. 2 are coupled to ground.

The primary FETs 213 and 223 have gate terminals receiving first and second primary gate signals $V_{Q1}$ and $V_{Q2}$ from a primary side controller (e.g., the primary side controller 170 of FIG. 1), respectively. The first and second primary gate signals $V_{Q1}$ and $V_{Q2}$ may be substantially 180° out of phase with respect to each other. The primary side circuit 204 generates a primary side current $I_{pr}$ in response to a switching frequency of the primary gate signals $V_{Q1}$ and $V_{Q2}$. When a magnitude of a resonance capacitor voltage across the magnetizing inductor 253 becomes equal to or greater than a reflected output voltage, the secondary side current $I_{sr}$ in FIG. 2 starts to conduct through either the first switching device 205 or the second switching device 225. When the magnitude of the resonance capacitor voltage becomes equal to or greater than the reflected output voltage and the first and second switching devices 205 and 225 are both off, the secondary side current $I_{sr}$ in FIG. 2 is conducted through a body diode of one of the first and second switching devices 205 and 225, according to the polarity of the resonance capacitor voltage.

The secondary side current $I_{sr}$ in FIG. 2 charges the output capacitor 245 to provide the output voltage $V_{out}$ to a load (e.g., the load 151 of FIG. 1). The output capacitor 245 in FIG. 2 has a first end connected to a node between the first and second secondary windings 263 and 273 and a second end connected to a ground.

In FIG. 2, the first SR controller 215 detects a drain-to-source voltage of the first switching device 205, and turns the first switching device 205 on or off in response to the detected drain-to-source voltage. The second SR controller 235 detects a drain-to-source voltage of the second SR switching device 225, and turns the second SR switching device 225 on or off in response to the detected drain-to-source voltage. Although the secondary side circuit 214 of the LLC converter 210 shown in FIG. 2 includes two SR controllers 215 and 235 and two switching device 205 and 225, embodiments of the present disclosure are not limited thereto. Operations of the first and second SR controllers 215 and 235 will be described below in more detail with reference to FIGS. 3 and 4. Throughout the present disclosure, the phrase "in response to" may refer to direct causation, indirect causation, or both.

Figure 3:
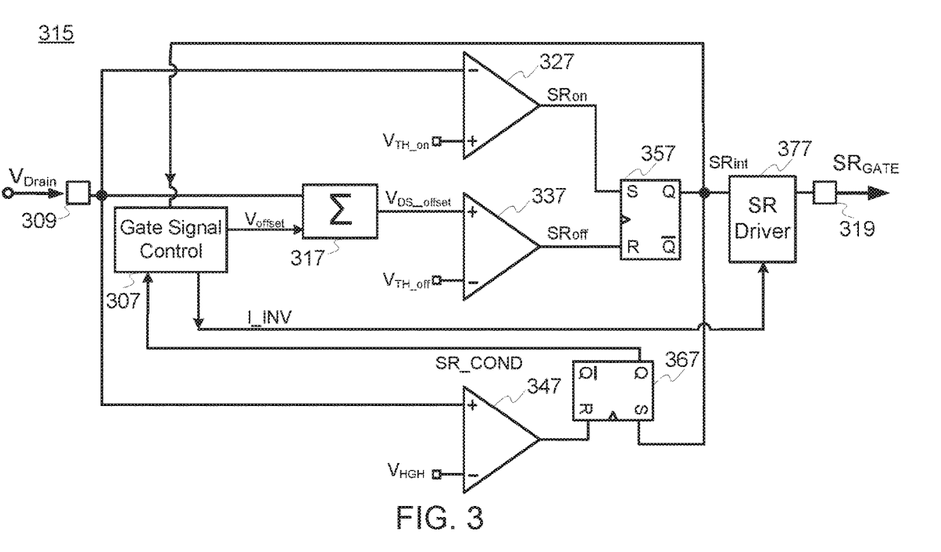
FIG. 3 illustrates an SR controller suitable for use as one or both of first and second SR controllers of FIG. 1 according to an embodiment.

FIG. 3 illustrates one example embodiment of an SR controller 315 suitable for use as one or both the first and second SR controllers 215 and 235 of FIG. 1. The SR controller 315 in FIG. 3 receives an instantaneous drain voltage $V_{Drain}$ from a drain terminal of a switching device (e.g., the first switching device 205 or the second switching device 225 of FIG. 2) and provides a gate control signal $SR_{GATE}$ to a gate terminal of the switching device. The SR controller 315 in FIG. 3 includes a gate signal control circuit 307, an adder circuit 317, first, second, and third comparators 327, 337, and 347, first and second set/reset (RS) flip-flops 357 and 367, an SR driver 377. In the embodiment of FIG. 3, the drain voltage $V_{Drain}$ may have a negative value (relative to a ground, such as the ground shown coupled to the source of the first and second switching devices 205 and 225 in FIG. 2) when the switching device is conducting, including when the switching device is turned off but the body diode of the device is forward biased as well as when the switching device is turned on. The drain voltage $V_{Drain}$ may have a positive voltage when the switching device is turned off and the body diode of the device is reverse biased.

A first comparator 327 in FIG. 3 receives the drain voltage $V_{Drain}$ and a turn-on threshold voltage $V_{TH\_on}$ and generates a set signal $SR_{on}$ having a logic high value (or a first logic value) when the drain voltage $V_{Drain}$ drops below the turn-on threshold voltage $V_{TH\_on}$ in response to a current flowing through the body diode of the switching device. When the first RS flip-flop 357 receives the set signal $SR_{on}$ having the logic high value, the first RS flip-flop 357 in FIG. 3 generates a driver input signal $SR_{int}$ having a logic high value, causing the second RS flip-flop 367 to generate a conduction signal SR_COND having a logic high value.

The gate signal control circuit 307 in FIG. 3 receives the driver input signal $SR_{int}$ and the conduction signal SR_COND, and generates an offset voltage $V_{offset}$ and a load detection signal I_INV. In an embodiment, the load detection signal I_INV having a logic high value indicates an LLC converter (e.g., the LLC converter 210 of FIG. 2) in which the SR controller 315 is incorporated is operating in a low load condition.

The adder circuit 317 in FIG. 3 receives the offset voltage $V_{offset}$ and the drain voltage $V_{Drain}$, and adds the received voltages $V_{offset}$ and $V_{Drain}$ to generate an offset drain voltage $V_{DS\_offset}$. The adder circuit 317 provides the offset drain voltage $V_{DS\_offset}$ to the second comparator 337.

The second comparator 337 in FIG. 3 receives the offset drain voltage $V_{DS\_offset}$ and a turn-off threshold voltage $V_{TH\_off}$ and generates a reset signal $SR_{off}$ having the logic high value when the offset drain voltage $V_{DS\_offset}$ is equal to or greater than the turn-off threshold voltage $V_{TH\_Off}$. This may be equivalent to comparing the drain voltage $V_{Drain}$ to a virtual threshold turn-off voltage $V_{VTH\_OFF}$, shown in FIG. 4, wherein the virtual turn-off threshold voltage $V_{VTH\_OFF}$ is equal to $V_{VTH\_OFF}=V_{TH\_off}-V_{offset}$. When the first RS flip-flop 357 receives the reset signal $SR_{off}$ having the logic high value, the first RS flip-flop 357 in FIG. 3 generates the driver input signal $SR_{int}$ having a logic low value (or a second logic value).

The third comparator 347 in FIG. 3 receives the drain voltage $V_{Drain}$ and a high threshold voltage $V_{HGH}$ and generates a signal having the logic high value when the drain voltage $V_{Drain}$ is equal to or greater than the high threshold voltage $V_{HGH}$. When the second RS flip-flop 367 receives the signal having the logic high value from the third comparator 347, the second RS flip-flop 367 generates the conduction signal SR_COND having the logic low value.

The SR driver 377 in FIG. 3 receives the driver input signal $SR_{int}$ and the load detection signal I_INV and generates the gate control signal $SR_{GATE}$. In an embodiment, the SR driver 377 of FIG. 3 adjusts a turn-on delay of the gate control signal $SR_{GATE}$ in response to the load detection signal I_INV.

In the embodiment shown in FIG. 3, the SR controller 315 receives the drain voltage $V_{Drain}$ through a drain pin 309 connected to a drain of the switching device (e.g., the first switching device 205 or the second switching device 225 of FIG. 2) when the drain voltage $V_{Drain}$ is substantially equal to a drain-to-source voltage. However, embodiments of the present disclosure are not limited thereto. In another embodiment, the SR controller 315 includes an additional pin connected to a source of a switching device to more accurately detect the drain-to-source voltage.

Figure 4:
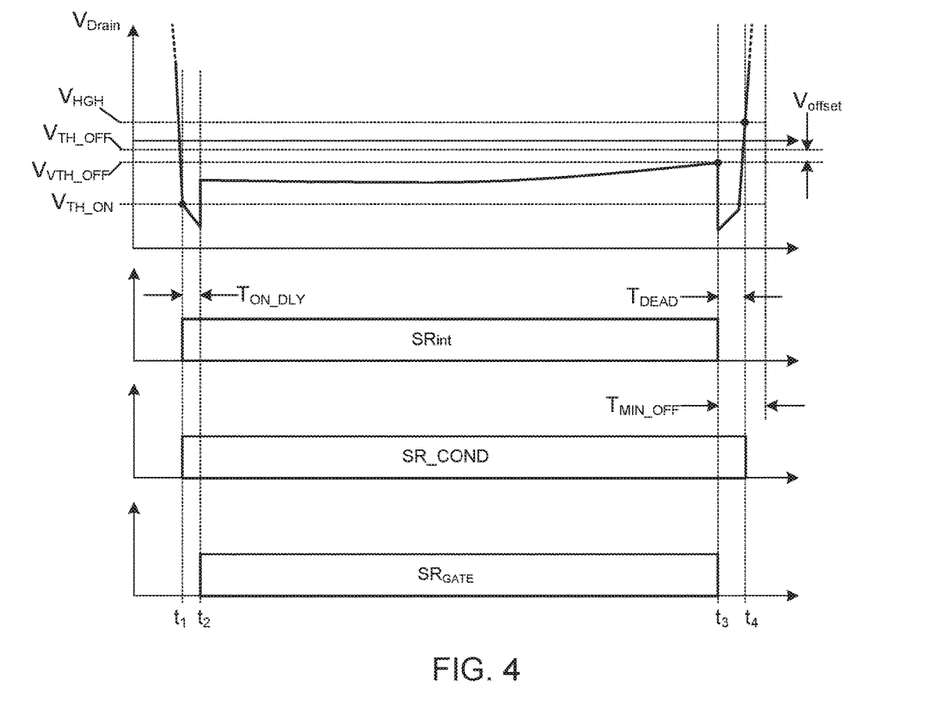
FIG. 4 illustrates example waveforms of a drain voltage, a driver input signal, a conduction signal, and a gate control signal according to the embodiment of the SR controller shown in FIG. 3.

FIG. 4 illustrates example waveforms of a drain voltage $V_{Drain}$, the driver input signal $SR_{int}$, the conduction signal SR_COND, and the gate control signal $SR_{GATE}$ according to the embodiment of the SR controller 315 in FIG. 3.

Before a first time $t_1$, a secondary side current (e.g., the secondary side current $I_{sr}$ of FIG. 2) conducts through a body diode of a switching device (e.g., the first switching device 205 or the second switching device 225 of FIG. 2). As a result, the drain voltage $V_{Drain}$ of the switching device decreases until the drain voltage $V_{Drain}$ reaches the turn-on threshold voltage $V_{TH\_on}$.

At the first time $t_1$, the drain voltage $V_{Drain}$ drops below the turn-on threshold voltage $V_{TH\_on}$ and causes the first comparator 327 to output the set signal $SR_{on}$ having a logic high value to the first RS flip-flop 357. As a result, the first RS flip-flop 357 outputs the driver input signal $SR_{int}$ having a logic high value, and thus the second RS flip-flop 367 generates the conduction signal SR_COND having a logic high value.

At a second time $t_2$, the SR driver 377 outputs the gate control signal $SR_{GATE}$ having a logic high value by delaying the driver input signal $SR_{int}$ by a turn-on delay $T_{ON\_DLY}$. In an embodiment, the turn-on delay $T_{ON\_DLY}$ varies in response to a value of the load detection signal I_INV. When the load detection signal I_INV indicates that the LLC converter (e.g., the LLC converter 210 of FIG. 2) is operating in the low load condition, the SR driver 377 delays the driver input signal $SR_{int}$ by a second delay amount (e.g., 400 ns) of the turn-on $T_{ON\_DLY}$. When the load detection signal I_INV indicates that the LLC converter is operating in a high load condition, the SR driver 377 delays the driver input signal $SR_{int}$ by a first delay amount (e.g., 100 ns) of the turn-on $T_{ON\_DLY}$, wherein the second delay amount of the turn-on $T_{ON\_DLY}$ is greater than the first delay amount of the turn-on $T_{ON\_DLY}$.

At a third time $t_3$, the drain voltage $V_{Drain}$ reaches a virtual turn-off threshold voltage $V_{VTH\_off}$, which can be represented by Equation 1 below:

$$V_{VTH\_off}=V_{TH\_off}-V_{offset} \qquad \text{Equation 1.}$$

As a result, the second comparator 337 outputs the reset signal $SR_{off}$ having a logic high value, and the first RS flip-flop 357 generates the driver input signal $SR_{int}$ having a logic low value. A minimum off-time circuit (not shown) prevents the gate control signal $SR_{GATE}$ from having a logic high value again during a minimum off-time $T_{MIN\_OFF}$), thus creating a dead time interval $T_{DEAD}$. For example, a target duration of the dead time interval $T_{DEAD}$ is in a range from 100 ns to 300 ns.

At a fourth time $t_4$, the drain voltage $V_{Drain}$ reaches the high threshold voltage $V_{HGH}$, and the third comparator 347 outputs a reset signal having the logic high value. As a result, the second RS flip-flop 367 generates the conduction signal SR_COND having the logic low value During a time interval between the second time $t_2$ and the third time $t_3$, a stray inductance of the switching device induces a positive voltage offset when a secondary side current (e.g., the secondary side current $I_{sr}$ of FIG. 2) flowing through the switching device decreases. Such a positive voltage offset may increase the drain voltage $V_{Drain}$, which may lead to a premature turn-off of the switching device. If the switching device is turned off prematurely, the secondary side current $I_{sr}$ may flow through the body diode of the switching device instead of through a channel of the switching device, which may decrease the efficiency of the SR circuit due to the higher voltage drop of the body diode compared to the channel.

In order to help keep a dead time interval $T_{DEAD}$ (or an actual dead time interval) between the third time $t_3$ and the fourth time $t_4$ substantially equal to a target dead time interval, the gate signal control circuit 307 in FIG. 3 adjusts a magnitude of the offset voltage $V_{offset}$, resulting in a change in the virtual turn-off threshold voltage $V_{VTH\_Off}$. For example, when the dead time interval $T_{DEAD}$ is greater than the target dead time interval in a current switching cycle, the gate signal control circuit 307 decreases the magnitude of the offset voltage $V_{offset}$ in a next switching cycle. As a result, the virtual turn-off threshold voltage $V_{VTH\_Off}$ increases in the next switching cycle, leading to a decrease in the dead time interval $T_{DEAD}$. When the dead time interval $T_{DEAD}$ is less than the target dead time interval in the current switching cycle, the gate signal control circuit 307 increases the magnitude of the offset voltage $V_{offset}$ in the next switching cycle, leading to a decrease in the virtual turn-off threshold voltage $V_{VTH\_Off}$ and an increase in the dead time interval $T_{DEAD}$.

In addition, a decreasing rate of the secondary side current in a low load condition may be less than that in a high load condition, and thus a positive voltage offset due to the stray inductance in the low load condition may be less than that in the high load condition. As a result, the drain voltage $V_{Drain}$ in the low load condition reaches the virtual turn-off threshold voltage $V_{VTH\_Off}$ at a time later than the drain voltage $V_{Drain}$ reaches the same level in the high load condition. The dead time interval $T_{DEAD}$ between the third time $t_3$ and the fourth time $t_4$ in the low load condition is more likely to be less than the target dead time interval than that in the high load condition.

When the dead time interval $T_{DEAD}$ is less than the target dead time interval, the gate signal control circuit 307 in FIG. 3 increases the magnitude of the offset voltage $V_{offset}$, as described above. Accordingly, a high magnitude of the offset voltage $V_{offset}$ may indicate that the LLC converter is operating in a relatively low load condition. On the other hand, a low magnitude of the offset voltage $V_{offset}$ may indicate that the LLC converter is operating in a relatively high load condition.

Figure 5:
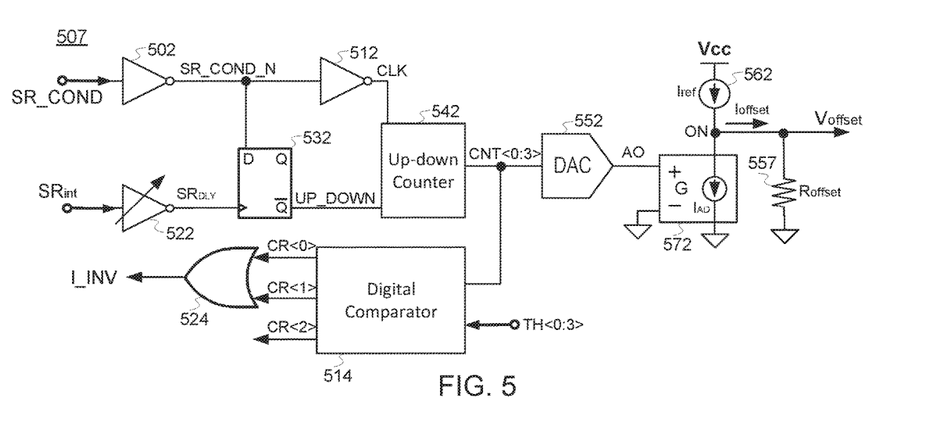
FIG. 5 illustrates a gate signal control circuit suitable for use as a gate signal control circuit of FIG. 3 according to an embodiment.

FIG. 5 illustrates a gate signal control circuit 507 suitable for use as the gate signal control circuit 307 of FIG. 3 according to an embodiment. The gate signal control circuit 507 receives a conduction signal SR_COND and a driver input signal $SR_{int}$, and generates an offset voltage $V_{offset}$ and a load detection signal I_INV.

The gate signal control circuit 507 includes first and second inverters 502 and 512, a delay circuit 522, a D flip-flop 532, an up-down counter 542, a digital-to-analog converter (DAC) 552, a current source 562, an adaptive current source 572, a digital comparator 514, and a logic gate 524.

The first inverter 502 in FIG. 5 receives the conduction signal SR_COND and generates an inverted conduction signal SR_COND_N (or an inverted version of the conduction signal SR_COND). The second inverter 512 in FIG. 5 receives the inverted conduction signal SR_COND_N and provides a clock signal CLK to the up-down counter 542.

The delay circuit 522 in FIG. 5 receives the driver input signal $SR_{int}$, and inverts the driver input signal $SR_{int}$ with a predetermined delay amount to generate a delayed input signal $SR_{DLY}$. The predetermined delay amount corresponds to a target dead time interval, e.g., 200 ns.

The D-flip flop 532 in FIG. 5 receives the inverted conduction signal SR_COND_N and the delayed input signal $SR_{DLY}$, and generates a direction signal UP_DOWN through a Q output. In an embodiment, the direction signal UP_DOWN having a logic high value causes the up-down counter 542 to count up from a stored value and the direction signal UP_DOWN having a logic low value causes the up-down counter 542 to count down from the stored value.

The up-down counter 542 in FIG. 5 receives the direction signal UP_DOWN and the clock signal CLK, and generates a count signal CNT<0:3>. In the embodiment shown in FIG. 5, the up-down counter 542 generates the count signal CNT<0:3> having a four-bit value ranging from 0 to 15, that saturates at the ends of the range (i.e., that remains at 15 when counting up from 15, and that remains at zero when counting down from zero). However, embodiments of the present disclosure are not limited thereto.

The DAC 552 in FIG. 5 receives the count signal CNT<0:3> and converts the received signal CNT<0:3> into an analog signal AO. For example, the analog signal AO is a voltage signal having a level proportional to the four-bit value of the count signal CNT<0:3>.

The adaptive current source 572 in FIG. 5 receives the analog signal AO and generates an adaptive current $I_{AD}$ having a magnitude that is proportional to a magnitude of the analog signal AO. The current source 562 generates a reference current $I_{ref}$ having a substantially constant magnitude.

At an output node ON, the reference current $I_{ref}$ is divided into an offset current $I_{offset}$ and the adaptive current $I_{AD}$. As a result, a magnitude of the offset current $I_{offset}$ increases when the magnitude of the adaptive current $I_{AD}$ decreases, and the magnitude of the offset current $I_{offset}$ decreases when the magnitude of the adaptive current $I_{AD}$ increases.

A resistor 557 in FIG. 5 has a first end connected to the output node ON and a second end connected to a ground. The resistor 557 generates the offset voltage $V_{offset}$, which can be represented by Equation 2 below:

$$V_{offset} = I_{offset} \times R_{offset} \qquad \text{Equation 2.}$$

In Equation 2, $R_{offset}$ denotes a resistance value of the resistor 557.

The digital comparator 514 in FIG. 5 compares the count signal CNT<0:3> to a threshold signal TH<0:3> and generates first, second, and third comparison signals CR<0>, CR<1>, and CR<2> in response to the comparison result. In an embodiment, the first comparison signal CR<0> has a logic high value when the count signal CNT<0:3> has a value less than the threshold signal TH<0:3>, the second comparison signal CR<1> has the logic high value when the count signal CNT<0:3> has a value equal to the threshold signal TH<0:3>, and the third comparison signal CR<1> has the logic high value when the count signal CNT<0:3> has a value greater than the threshold signal TH<0:3>. In an embodiment, the value of the threshold signal TH<0:3> is equal to or less than 30% of a maximum value of the count signal. For example, the value of the threshold signal TH<0:3> may be [0 1 0 0] (i.e., 2) when the maximum value of the count signal CNT<0:3> is [1 1 1 1] (i.e. 15).

The logic gate 524 in FIG. 5 receives the first and second comparison signals CR<0> and CR<1> and outputs the load detection signal I_INV in response to the received signals CR<0> and CR<1>. In an embodiment, the logic gate 524 is an OR gate and generates the load detection signal I_INV when the count signal CNT<0:3> has a value equal to or less than the threshold signal <0:3>.

Figure 6:
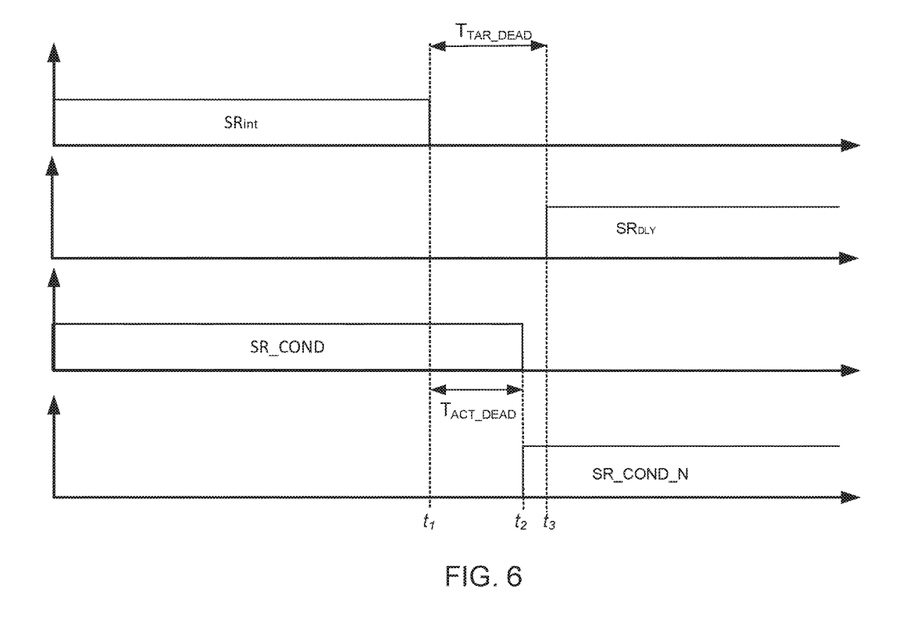
FIG. 6 illustrates example waveforms of a driver input signal, a delayed input signal, a conduction signal, and an inverted conduction signal according to the embodiment of the gate signal control circuit shown in FIG. 5.

FIG. 6 illustrates example waveforms of the driver input signal $SR_{int}$, the delayed input signal $SR_{DLY}$, the conduction signal SR_COND, and the inverted conduction signal SR_COND_N according to the embodiment of the gate signal control circuit 507 shown in FIG. 5. An operation of the gate signal control circuit 507 in FIG. 5 is explained below in more detail with reference to FIG. 6.

At a first time $t_1$, the driver input signal $SR_{int}$ transitions from a logic high value to a logic low value. The first time $t_1$ of FIG. 6 corresponds to the third time $t_3$ of FIG. 4.

At a second time $t_2$, the conduction signal SR_COND transitions from the logic high value to the logic low value, and the first inverter 502 in FIG. 5 generates the inverted conduction signal SR_COND_N having the logic high value. The second time $t_2$ of FIG. 6 corresponds to the fourth time $t_4$ of FIG. 4.

At a third time $t_3$, the delay circuit 522 in FIG. 5 inverts the driver input signal $SR_{int}$ with a predetermined delay amount, which is equal to the target dead time interval $T_{TAR\_DEAD}$. As a result, the delay circuit 522 provides the delayed input signal $SR_{DLY}$ having the logic high value to the D flip-flop 532.

Because the first time $t_1$ corresponds to a time (e.g., the third time $t_3$ of FIG. 4) when a drain-to-source voltage reaches a virtual turn-off threshold voltage and the second time $t_2$ corresponds to a time (e.g., the fourth time $t_4$ of FIG. 4) when the drain-to-source voltage reaches a high threshold voltage, a time interval between the first time $t_1$ and the second time $t_2$ corresponds to an actual dead time interval $T_{ACT\_DEAD}$. Thus, FIG. 6 illustrates a case in which the actual dead time interval $T_{ACT\_DEAD}$ is less than the target dead time interval $T_{TAR\_DEAD}$.

The inverted conduction signal SR_COND_N has been asserted at the second time $t_2$, prior to the third time $t_3$. As a result, when the D flip-flop 532 in FIG. 5 receives the delayed input signal $SR_{DLY}$ at the third time $t_3$, the $\overline{Q}$ output of the D flip-flop 532 generates the direction signal UP_DOWN having the logic low value.

When the up-counter 542 in FIG. 5 receives the direction signal UP_DOWN having the logic low value from the D flip-flop 532, the up-counter 542 functions as a down counter. When the value of the count signal CNT<0:3> decreases, the magnitude of the adaptive current $I_{AD}$ also decreases, leading to an increase in the magnitude of the offset current $I_{offset}$ and an increases in the level of the offset voltage $V_{offset}$. As a result, the actual dead time interval $T_{ACT\_DEAD}$ increases towards the target dead time interval $T_{TAR\_DEAD}$.

On the other hand, if the actual dead time interval $T_{ACT\_DEAD}$ had been longer than the target dead time interval $T_{TAR\_DEAD}$, the inverted conduction signal SR_COND_N would have been deasserted at the third time $t_3$. As a result, the $\overline{Q}$ output of the D flip-flop 532 would have generated the direction signal UP_DOWN having the logic high value, and the up-counter 542 would have functioned as an up counter, leading to a decrease in the magnitude of the offset current $I_{offset}$ and a decrease in the level of the offset voltage $V_{offset}$. As a result, the actual dead time interval $T_{ACT\_DEAD}$ would have decreased towards the target dead time interval $T_{TAR\_DEAD}$.

When the value of the count signal CNT<0:3> becomes equal to or less than the value of the threshold signal TH<0:3>, one of the first and second comparison signals CR<O> and CR<1> has the logic high value. As a result, the OR gate 524 in FIG. 5 generates the load detection signal I_INV having the logic high value.

As described above, the level of the offset $V_{offset}$ having a high magnitude may indicate that an LLC converter operates in a low load condition. When the magnitude of the offset voltage $V_{offset}$ is sufficiently high that the value of the count signal CNT<0:3> becomes equal to or less than the value of the threshold signal TH<0:3>, the load detection signal I_INV has the logic high value. Thus, the load detection signal I_INV having the logic high value also indicates that the LLC converter operates in the low load condition.

Figure 7:
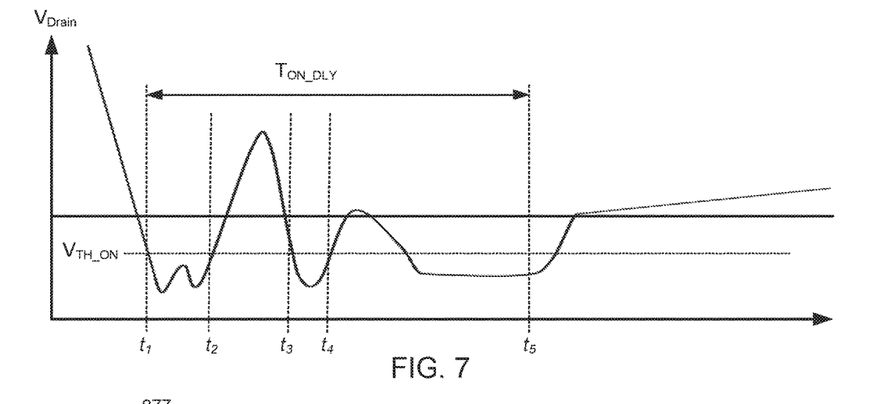
FIG. 7 illustrates example waveforms of a drain voltage in a low load condition.

FIG. 7 illustrates example waveforms of a drain voltage $V_{Drain}$ in the low load condition according to the embodiment of the gate signal control circuit 507 in FIG. 5. In this embodiment, the drain voltage $V_{Drain}$ is substantially equal to a drain-to-source voltage. An operation of such an LLC converter (e.g., the LLC converter 210 of FIG. 2) in a low load condition is explained below in more detail with reference to FIG. 7.

In the low load condition, a magnitude of a resonance capacitor voltage across a magnetizing inductor (e.g., the magnetizing inductor 253 of FIG. 2) may be less than a reflected output voltage. As a result, a primary side switching transition may not cause a secondary side current (e.g., the secondary side current $I_{sr}$ of FIG. 2) to flow during a specific time interval until the magnitude of the resonance capacitor becomes equal to or greater than the reflected output voltage. In other words, the secondary side current is delayed to flow through a switching device (e.g., the first switching device 205 or the second switching device 225 of FIG. 2) in a secondary side circuit (e.g., the secondary side circuit 214 of FIG. 2) during the specific time interval.

However, the primary side switching transition may cause a capacitive current spike when the switching device is turned off. Such a capacitive current spike causes oscillations in the drain voltage $V_{Drain}$, which may induce mis-triggering of the switching device during the specific time interval.

Referring to FIG. 7, the drain voltage $V_{Drain}$ becomes less than an on-time threshold voltage $V_{TH\_ON}$ during a first time interval between first and second times $t_1$ and $t_2$ and a second time interval between third and fourth times $t_3$ and $t_4$. If an turn-on delay $T_{ON\_DLY}$ were smaller than a time interval between the first time $t_1$ and the fourth time $t_4$, the switching device would be turned on by the mis-triggering during the first and second time intervals, and an inversion current would flow through the turned on switching device.

An SR driver (e.g., the SR driver 377 of FIG. 3) increases the turn-on delay $T_{ON\_DLY}$ sufficiently large to avoid an occurrence of the inversion current, when the SR driver receives a load detection signal (e.g., the load detection signal I_INV of FIG. 3) indicating the low load condition. In an embodiment, the turn-on delay $T_{ON\_DLY}$ is equal to or greater than two times, three times, four times, or five times of an oscillation period of the drain voltage $V_{Drain}$ resulting from the capacitive current spike.

Figure 8:
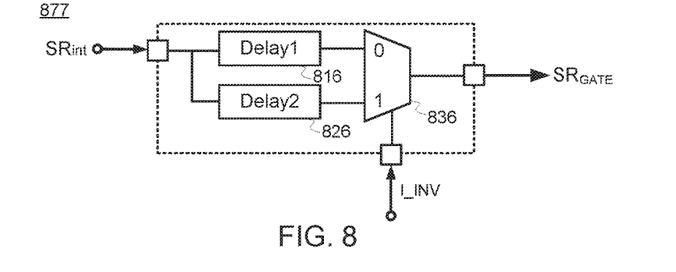
FIG. 8 illustrates an SR driver suitable for use as an SR driver of FIG. 3 according to an embodiment.

FIG. 8 illustrates an SR driver 877 suitable for use as the SR driver 377 of FIG. 3 according to an embodiment. The SR driver 877 includes a first delay circuit 816, a second delay circuit 726, and a multiplexer (MUX) 836.

The first delay circuit 816 in FIG. 8 delays a rising edge of the driver input signal $SR_{int}$ by a first delay amount and provides a first delayed input signal to the MUX 836. The second delay circuit 826 in FIG. 8 delays the rising edge of the driver input signal $SR_{int}$ by a second delay amount and provides a second delayed input signal to the MUX 836. The delay circuits 816 and 826 do not substantially delay a falling edge (that is, a deassertion) of the driver input signal $SR_{int}$. The second delay amount is greater than the first delay amount. In an embodiment, the second delay amount is equal to or greater than two times, four times, six times, eight times, or ten times of the first delay amount.

The MUX 836 in FIG. 8 receives a load detection signal I_INV (e.g., the load detection signal I_INV of FIG. 3) and selects one of the first and second delayed input signals in response to the load detection signal I_INV. In an embodiment, the MUX 836 selects the second delayed input signal when the load detection signal I_INV indicates low load condition. As a result, the MUX 836 provides the second delayed input signal as a gate control signal $SR_{GATE}$ when the low load condition is determined to exist, and provides the first delayed input signal as the gate control signal $SR_{GATE}$ otherwise.

As described above, the SR driver 877 in FIG. 8 increases a turn-on delay from the first delay amount to the second delay amount when the low load condition is detected. The second delay amount corresponds to a turn-on delay (e.g., the turn-on delay $T_{ON\_DLY}$ of FIG. 7), and thus an occurrence of an inversion current through a switching device may be avoided.

Figure 9:
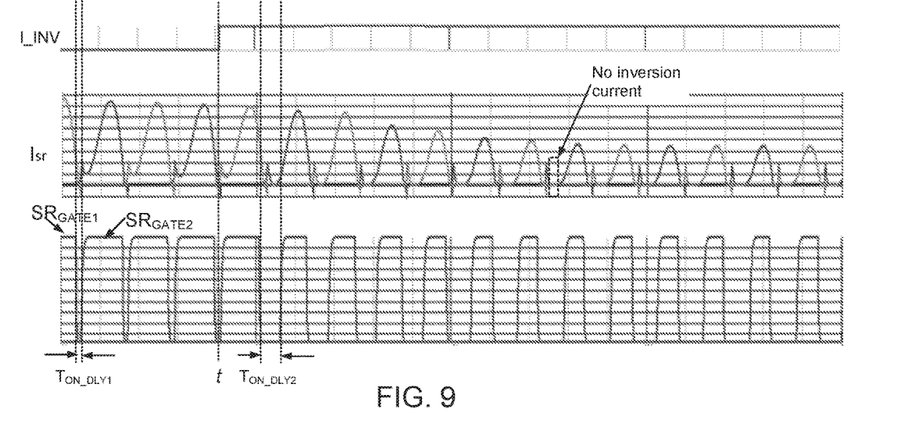
FIG. 9 illustrates waveforms of a load detection signal, a secondary side current, and first and second gate control signals according to an embodiment.

FIG. 9 illustrates waveforms of a load detection signal I_INV, a secondary side current $I_{sr}$, and first and second gate control signals $SR_{GATE1}$ and $SR_{GATE2}$ according to an embodiment. Specifically, the first gate control signal $SR_{GATE1}$ corresponds to a gate control signal from a first SR controller (e.g., the first SR controller 215 of FIG. 2) and a second gate control signal $SR_{GATE2}$ correspond to a gate control signal from a second SR controller (e.g., the second SR controller 235 of FIG. 2). In an embodiment, the load detection signal I_INV is generated by a circuit shared by the first and second SR controllers, but embodiments are not limited thereto.

Prior to a specific time t, an LLC converter (e.g., the LLC converter 210 of FIG. 2) operates in a high load condition. In the high load condition, the load detection signal I_INV has a logic low value and each of the first and second gate control signals $SR_{GATE1}$ and $SR_{GATE2}$ has a first turn-on delay $T_{ON\_DLY1}$.

At the specific time t, the load detection signal I_INV transitions from the logic low value to a logic high value. As a result, each of the first and second gate control signals $SR_{GATE1}$ and $SR_{GATE2}$ has a second turn-on delay $T_{ON\_DLY2}$, which is greater than the first turn-on delay $T_{ON\_DLY1}$.

The second turn-on delay $T_{ON\_DLY2}$ is sufficiently great to avoid an occurrence of an inversion current when a secondary side current (e.g., the secondary side current $I_{sr}$ of FIG. 2) is delayed to flow through a switching device (e.g., the first switching device 205 or the second switching device 225 of FIG. 2) in light load condition. As a result, discharging of an output capacitor (e.g., the output capacitor 245 of FIG. 2) due to such an inversion current may be also avoided. Accordingly, the LLC converter according to an embodiment performs a regulation operation more efficiently compared to a conventional LLC converter that does not implement an adaptive turn-on delay based on light load detection.

Figure 10:
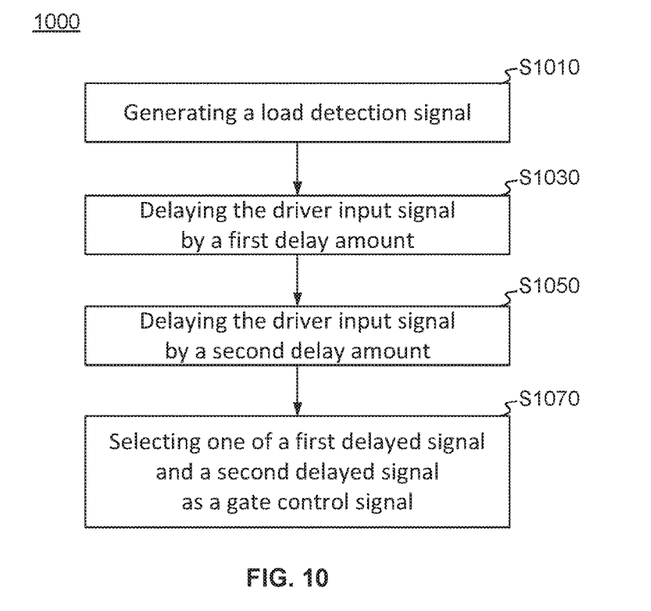
FIG. 10 illustrates a process performed by an LLC converter according to an embodiment.

FIG. 10 illustrates a process 1000 performed by an LLC converter (e.g., the LLC converter 210 of FIG. 2) according to an embodiment. In an embodiment, the LLC converter includes an SR controller (e.g., the first SR controller 215 or the second SR controller 235 of FIG. 2). The SR controller includes a gate signal control circuit (e.g., the gate signal control circuit 307 of FIG. 3) and an SR driver (e.g., the SR driver 377 of FIG. 3).

At S1010, the gate signal control circuit generates a load detection signal (e.g., the load detection signal I_INV of FIG. 3) in response to a conduction signal (e.g., the conduction signal SR_COND of FIG. 3) and a driver input signal (e.g. the driver input signal $SR_{int}$ of FIG. 3).

At S1030, the SR driver delays the driver input signal by a first delay amount to generate a first delayed signal.

At S1050, the SR driver delays the driver input signal by a second delay amount to generate a second delayed signal.

At S1070, the SR driver selects one of the first delayed signal and the second delayed signal as a gate control signal (e.g., the gate control signal $SR_{GATE}$ of FIG. 3) in response to the load detection signal. In an embodiment, the SR driver selects the first delayed signal in response to the load detection signal having a first logic value (e.g., a logic low value), and selects the second delayed signal in response to the load detection signal having a second logic value (e.g., a logic high value).

In an embodiment, the detection signal having the second logic value indicates that the LLC converter operates in a low load condition. The second delay amount is greater than the first delay amount to avoid an occurrence of an inversion current in a secondary side circuit (e.g., the secondary side circuit 214 of FIG. 2).

Figure 11:
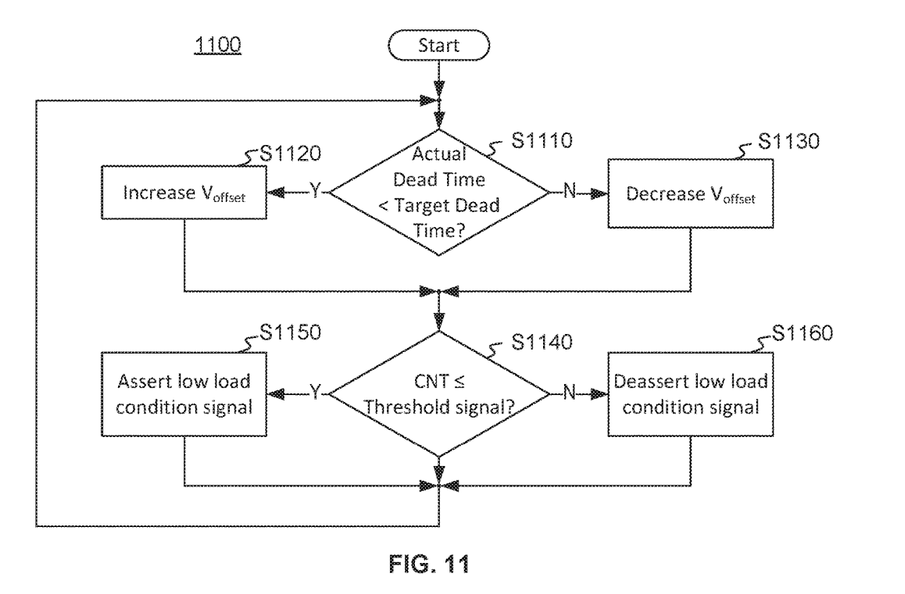
FIG. 11 illustrates a process performed in an LLC converter according to an embodiment.

FIG. 11 illustrates a process 1100 performed in an LLC converter (e.g., the LLC converter 210 of FIG. 2) according to an embodiment. In an embodiment, the process 1100 is performed by an SR controller (e.g., the first SR controller 215 or the second SR controller 235 of FIG. 2) included in the LLC converter.

At S1110, the SR controller determines whether an actual dead time (e.g., the actual dead time $T_{ACT\_DEAD}$ of FIG. 6) is equal to or less than a target dead time (e.g., the target dead time $T_{TAR\_DEAD}$ of FIG. 6).

When the actual dead time is less than the target dead time, the process 1100 proceeds to S1120. At S1120, the SR controller increases an offset voltage (e.g., the offset voltage $V_{offset}$ of FIG. 5), leading to an increase of the actual dead time. Otherwise, the process 1100 proceeds to S1130, and the SR controller decreases the offset voltage, leading to a decrease of the actual dead time.

At S1140, the SR controller determines whether a count signal (e.g., the count signal CNT<0:3> of FIG. 5) has a value equal to or less than a threshold signal (e.g., the threshold signal TH<0:3> of FIG. 5). In an embodiment, when a magnitude of the offset voltage is inversely proportional to the value of the count signal.

When the value of the count signal is equal to or less than that of the threshold signal, the process 1100 proceeds to S1150. At S1150, the SR controller asserts a low load condition signal (e.g., the load detection signal I_INV of FIG. 5) to indicate that the LLC converter is operating in a low load condition. When the value of the count signal is greater than that of the threshold signal, the process 1100 proceeds to S1160. At S1160, the SR controller deasserts the low load condition signal.

Aspects of the present disclosure have been described in conjunction with the specific embodiments thereof that are proposed as examples. Numerous alternatives, modifications, and variations to the embodiments as set forth herein may be made without departing from the scope of the claims set forth below. Accordingly, embodiments as set forth herein are intended to be illustrative and not limiting.

What is claimed is:

1. A method for controlling a power converter, the method comprising:
    generating a load detection signal in response to a conduction signal and a driver input signal;
    generating a gate control signal in response to the load detection signal, the gate control signal being delayed by a delay amount in response to the load detection signal, the load detection signal indicating that the power converter is operating under a specific load condition;
    selecting a first delayed signal as the gate control signal in response to the load detection signal having a first logic value, the first delayed signal being the driver input signal that has been delayed by a first delay amount; and
    selecting the second delayed signal as the gate control signal in response to the load detection signal having a second logic value, the second delayed signal being the driver input signal that has been delayed by a second delay amount, the second delay amount being greater than the first delay amount.

2. The method of claim 1, further comprising:
    generating a count signal in response to the conduction signal and the driver input signal, the count signal indicating a number of transitions of the conduction signal;
    comparing a value of the count signal to a value of a threshold signal; and
    causing the load detection signal to transition from the first logic value to the second logic value when the value of the count signal is equal to or less than the value of the threshold signal.

3. The method of claim 2, further comprising:
    delaying the driver input signal by a third delay amount to generate a delayed input signal; and
    generating a direction signal in response to the delayed input signal and an inverted version of the conduction signal.

4. The method of claim 3, further comprising:
    increasing the value of the count signal in response to the direction signal having the second logic value; and
    decreasing the value of the count signal in response to the direction signal having the first logic value.

5. The method of claim 2, wherein the value of the threshold signal is equal to or less than 30% of a maximum value of the count signal.

6. The method of claim 2, further comprising:
    generating an adaptive current in response to the count signal, the adaptive current having a magnitude proportional to the value of the count signal; and
    subtracting the adaptive current from a reference current to generate an offset current.

7. The method of claim 6, further comprising:
    generating an offset voltage in response to the offset current.

8. The method of claim 6, further comprising:
    converting the count signal into an analog signal,
    wherein the magnitude of the adaptive current is proportional to a value of the analog signal.

9. The method of claim 1, further comprising generating a count signal in response to the conduction signal and the driver input signal,
    wherein the load detection signal is asserted in response to the count signal having a value within a given range, the given range indicating that the power converter is operating under a low load condition.

10. An apparatus for controlling a power converter comprising:
    a gate signal control circuit configured to generate a load detection signal in response to a conduction signal and a driver input signal; and
    a synchronous rectifier (SR) driver configured to generate a gate control signal in response to the load detection signal, the gate control signal being delayed by a delay amount in response to the load detection signal, the load detection signal indicating that the power converter is operating under a specific load condition,
    wherein the SR driver includes:
        a first delay circuit delaying the driver input signal by the first delay amount to generate a first delayed signal;
        a second delay circuit delaying the driver input signal by the second delay amount to generate a second delayed signal; and
        a multiplexer (MUX) selecting the first delayed signal as the gate control signal in response to the load detection signal having the first logic value, the MUX selecting the second delayed signal as the gate control signal in response to the load detection signal having the second logic value.

11. The apparatus of claim 10, wherein the second delay amount is greater than the first delay amount, and
    wherein the gate signal control circuit includes:
        a counter generating a count signal in response to the conduction signal and the driver input signal, the count signal indicating a number of transitions of the conduction signal;
        a comparator comparing a value of the count signal to a value of a threshold signal; and
        a logic gate causing the load detection signal to transition from the first logic value to the second logic value when the value of the count signal is equal to or less than the value of the threshold signal.

12. The apparatus of claim 11, wherein the gate signal control circuit further includes:
    a delay circuit delaying the driver input signal by a third delay amount to generate a delayed input signal; and
    a flip-flop generating a direction signal in response to the delayed input signal and an inverted version of the conduction signal.

13. The apparatus of claim 12, wherein the counter increases the value of the count signal in response to the direction signal having the second logic value, and
    wherein the counter decreases the value of the count signal in response to the direction signal having the first logic value.

14. The apparatus of claim 11, wherein the value of the threshold signal is equal to or less than 30% of a maximum value of the count signal.

15. The apparatus of claim 11, wherein the gate signal control circuit further includes:
- an adaptive current source generating an adaptive current in response to the count signal, the adaptive current having a magnitude proportional to the value of the count signal;
- a current source generating a reference current, the reference current having a substantially constant magnitude; and
- an output node connected between an output of the current source and an input of the adaptive current source.

16. The apparatus of claim 15, the gate signal control circuit further includes:
- a resistor having a first end connected to the output node and a second end connected to a ground, an offset current flowing through the resistor, a voltage at the first end being an offset voltage.

17. The apparatus of claim 15, wherein the gate signal control circuit further includes:
- a digital-to-analog converter (DAC) converting the count signal into an analog signal,
- wherein the adaptive current source generates the adaptive current having the magnitude that is proportional to a value of the analog signal.

18. An apparatus for controlling a power converter comprising:
- a gate signal control circuit configured to generate a load detection signal in response to a conduction signal and a driver input signal; and
- a synchronous rectifier (SR) driver configured to generate a gate control signal in response to the load detection signal, the gate control signal being delayed by a delay amount in response to the load detection signal,
- wherein the SR driver generates the gate control signal by delaying the driver input signal by a first delay amount if the load detection signal has a first logic value, or by delaying the driver input signal by a second delay amount if the load detection signal has a second logic value, the second delay amount being greater than the first delay amount, and
- wherein the gate signal control circuit includes:
  - a counter generating a count signal in response to the conduction signal and the driver input signal, the count signal indicating a number of transitions of the conduction signal;
  - a comparator comparing a value of the count signal to a value of a threshold signal; and
  - a logic gate causing the load detection signal to transition from the first logic value to the second logic value when the value of the count signal is equal to or less than the value of the threshold signal.

* * * * *